March 13, 1934.  B. W. TWYMAN  1,950,640
FOOT PEDAL JACK
Filed Dec. 19, 1929
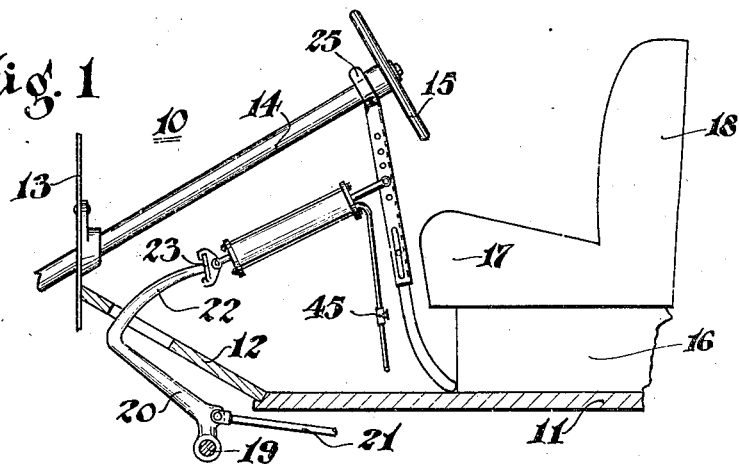
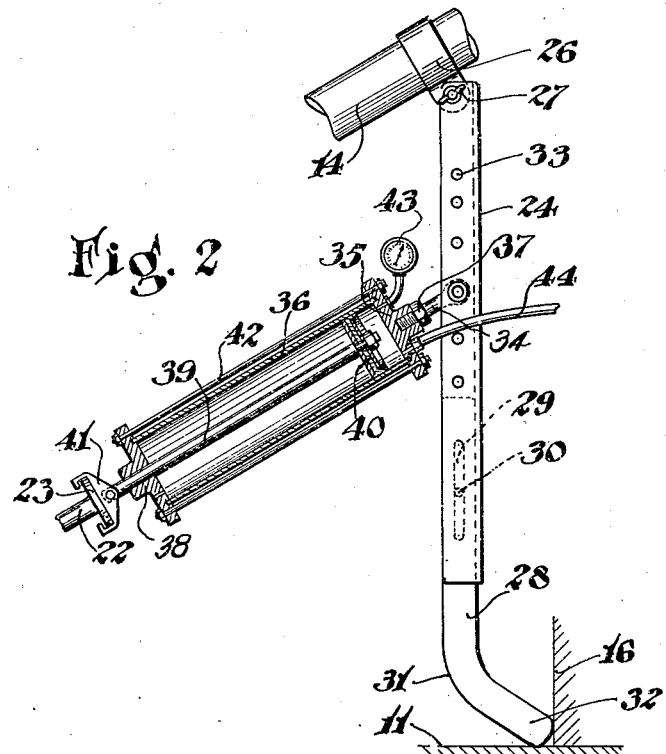
INVENTOR.
B. Wickliffe Twyman
BY
ATTORNEY Patented Mar. 13, 1934

1,950,640

UNITED STATES PATENT OFFICE 1,950,640

FOOT PEDAL JACK

B. Wickliffe Twyman, South Bend, Ind., assignor to Bendix-Cowdrey Brake Tester, Inc., Fitchburg, Mass., a corporation of Delaware Application December 19, 1929, Serial No. 415,174

8 Claims. (Cl. 254—93)

This invention relates to brake applying devices and more particularly devices for applying brakes for testing purposes.

Heretofore, various means have been employed for applying the brakes of a motor vehicle while under test. It has been common practice to apply the brakes through the foot lever and to lock the lever in a depressed position by a suitable chock. This requires manual manipulation of the foot brake lever both in applying and removing the locking means or chock. In other devices the brakes are locked in applied position by a bracket attached to the steering post of the vehicle, so that one arm thereof may be swung in the path of the foot brake lever to engage and secure the lever in a depressed position. This requires careful adjustment of the bracket to the steering post and it has an additional objection in that it also requires manual manipulation of the foot brake lever both in applying and disengaging the device. It is the aim of the present invention to overcome these objections.

An object of the invention is to provide a device for applying the brakes of a motor vehicle while they are undergoing a test or adjustment.

Another object of the invention is to provide a device for applying the brakes of a motor vehicle through the foot brake lever.

Another object of the invention is to provide a device for applying the brakes of a motor vehicle through the foot brake lever which may be easily and quickly applied or removed and will efficiently perform its intended functions.

A further object of the invention is to provide a device of the character described, which may be easily and quickly adjusted to any type of motor vehicle for operating the foot brake lever thereof to apply and retain the brakes in applied position while they are under test.

A still further object of the invention is to provide a device of the character described, which has the advantages of a positive locking means for the foot brake lever, is highly efficient in operation, and yet of marked simplicity as a whole in respect to each of its component parts, so that its manufacture may be economically facilitated both as regards to parts and their assembly.

Other objects of the invention will appear from the following description taken in connection with the drawing, which form a part of this specification, and in which:

Figure 1 is a side elevation of a motor vehicle body partly in section and partly broken away illustrating the invention as applied; and Figure 2 is an enlarged detail view partly in elevation and partly in section embodying the invention.

Referring to the drawing for more specific details of the invention, 10 represents generally the body of a motor vehicle having the conventional floor boards 11 and foot board 12. The body has a dash 13 on which is secured a steering column 14 having mounted thereon for rotation a suitable steering wheel 15. Positioned on the floor boards 13 in a fixed or movable position is a seat frame 16 supporting an operator's seat 17, having the usual back 18.

Journaled on a stub shaft 19 on one side of the transmission housing, not shown, is a foot lever 20 connected through a suitable rod or linkage 21 to brake mechanism, not shown. The lever 20 has an arm 22 extending substantially at right angles thereto through a suitable slot in the foot board 12, and provided on its free end with a foot pedal 23. The above structure is common in motor vehicles generally.

The brake applying device comprises a sleeve or channel support member 24 formed with a fork end 25 adapted to straddle the steering column beneath the hub of the steering wheel. It may be found desirable to replace the fork end portion by a sleeve 26 sprung around the steering post and secured to the channel member as by a bolt and thumb nut 27.

The channel member has slidably mounted therein an arm 28. This arm is provided with a slot 29 through which passes a pin 30 positioned transversely in the member 24, so that the arm 28 may be free to move within certain limits and is yet retained against displacement with respect to the channel support member.

The free end of the arm 28 is curved as indicated at 31 and provided with a rounded finished end portion 32. This end portion of the arm engages a crotch formed by the floor boards 11 and the heel board of the frame 16 of the seat. The rounded finished end portion serves to prevent maring the heel board or such covering as may be applied thereto and the curved portion 31 of the arm serves to position the member 24 substantial in a vertical plane.

The support member 24 is provided with a plurality of transverse apertures arranged in spaced relation. Detachably and pivotally secured on the member 24 as by a bolt passing through one set of the apertures 33 is a stud 34. This stud is threaded in a head 35 of a cylinder 36 and is locked against displacement by a nut 37. The other head 38 of the cylinder has positioned therein for reciprocation a piston rod 39. This rod has on one end thereof within the cylinder a piston 40, and pivotally connected to the other end of the rod is a yoke 41 adapted to be slipped over a foot pedal 43 on the lever arm 22.

The cylinder may be of any preferred structure. It is, however, desirable that it may be substantial and to that end the heads 35 and 38 are clamped on the respective ends of the cylinder by rods 42. Positioned in the head 35 is a suitable pressure indicating gauge 43 by means of which the pressure on the foot brake lever may be determined, and communicating with the cylinder through a suitable orifice in the head 35 is a pipe line 44 in which is positioned a valve 45, or the valve may be positioned in the head of the cylinder. The pipe line 44 leads to and is connected with a suitable source of compressed air, not shown.

It should be perfectly clear that by adjusting the device substantially as shown in Figure 1 and admitting air to the cylinder that the piston is moved in a direction tending to depress the foot brake lever, and that upon obtaining sufficient pressure on the lever to properly apply the brakes, an indication of this condition is recorded on the gauge 43, whereupon the supply of air is shut off by the valve 45.

After the brakes have undergone test or adjustment, the pipe line is detached and the foot lever which is normally spring pressed serves to actuate the piston to dispel the air from the cylinder, so that the device may be readily detached.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. A device for depressing the foot brake lever of a motor vehicle comprising an adjustable support engaging fixed parts of the vehicle, a cylinder adjustably and pivotally connected to the support, a piston positioned for reciprocation in the cylinder having a rod connected thereto, means for pivotally connecting the rod to the lever and means for actuating the piston by introducing pressure in the cylinder.

2. A device for actuating the foot brake lever of a motor vehicle comprising a support positioned between the steering column and the heel board of the operator's seat of the vehicle, a cylinder pivotally connected to the support, a piston positioned for reciprocation in the cylinder and having a rod connected thereto, means for pivotally connecting the rod to the lever and means for introducing pressure in the cylinder to actuate the piston.

3. A device for actuating the foot brake lever of a motor vehicle comprising an adjustable support positioned between the steering column and the heel board of the operator's seat of the vehicle, a cylinder adjustably and pivotally connected to the support, a piston positioned for reciprocation in the cylinder and having a rod connected thereto, a yoke pivotally connected to the rod and adapted to engage a pedal on the lever, means for introducing pressure in the cylinder and means for controlling the pressure in the cylinder.

4. A device for actuating a pedal of a vehicle including, an actuating mechanism for acting on the pedal, means for attachment to the pedal, a swivel connection between the mechanism and said means, and means mounting the mechanism in the vehicle for tiltable movement about an axis transverse of the movement of the pedal.

5. A device for actuating a pedal of a vehicle including, an actuating mechanism for acting on the pedal, means for attachment to the pedal, a swivel connection between the mechanism and said means, and means mounting the mechanism in the vehicle for adjustment vertically and horizontally and for tiltable movement about an axis transverse of the movement of the pedal.

6. A device for actuating a pedal of a vehicle including, an actuating mechanism for acting on the pedal, means mounting the mechanism in the vehicle, including a substantially vertical frame, and a support for the frame adapted to engage a fixed part of the vehicle, and means for operating the mechanism.

7. A device for actuating a pedal of a vehicle including, an actuating mechanism for acting on the pedal, means mounting the mechanism in the vehicle including a frame carrying the mechanism and an adjustable extension on the frame adapted to engage a fixed part of the vehicle, and means for operating the mechanism.

8. A device for actuating a pedal of a vehicle including the actuating mechanism for acting on the pedal, means mounting the mechanism on the vehicle including a frame, means tiltably supporting the mechanism on the frame, and means at the opposite ends of the frame for engaging fixed parts of the vehicle, and means for operating the mechanism.

B. WICKLIFFE TWYMAN.